United States Patent
Li et al.

(10) Patent No.: US 9,582,311 B2
(45) Date of Patent: Feb. 28, 2017

(54) SYSTEM, METHOD AND COMPUTER PROGRAM PRODUCT FOR DATA PROCESSING AND SYSTEM DEPLOYMENT IN A VIRTUAL ENVIRONMENT

(71) Applicant: International Business Machines Corporation, Armonk, NY (US)

(72) Inventors: Li Li, Beijing (CN); Liang Liu, Beijing (CN); Rui Xiong Tian, Beijing (CN); Hao Wang, Beijing (CN); Qingbo Wang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/834,375

(22) Filed: Aug. 24, 2015

(65) Prior Publication Data

US 2015/0363222 A1 Dec. 17, 2015

Related U.S. Application Data

(62) Division of application No. 13/014,670, filed on Jan. 26, 2011, now Pat. No. 9,135,032.

(30) Foreign Application Priority Data

Jan. 29, 2010 (CN) .......................... 2010 1 0104977

(51) Int. Cl.
*G06F 12/00* (2006.01)
*G06F 13/00* (2006.01)
(Continued)

(52) U.S. Cl.
CPC .......... *G06F 9/45558* (2013.01); *G06F 9/455* (2013.01); *G06F 11/1458* (2013.01);
(Continued)

(58) Field of Classification Search
CPC ... G06F 9/455; G06F 12/16; G06F 2009/4557
(Continued)

(56) References Cited

U.S. PATENT DOCUMENTS

| 8,464,254 B1 | 6/2013 | Vohra et al. |
| 9,135,032 B2 | 9/2015 | Li et al. |

(Continued)

FOREIGN PATENT DOCUMENTS

| CN | 101414277 A | 4/2009 |
| CN | 101609419 B1 | 12/2009 |

OTHER PUBLICATIONS

Office Action from Chinese Application No. 201010104977.X, dated May 29, 2013.
(Continued)

*Primary Examiner* — Charles Rones
*Assistant Examiner* — Sidney Li
(74) *Attorney, Agent, or Firm* — Zilka-Kotab, PC

(57) ABSTRACT

In one embodiment, a method for deploying a data processing system in a virtual environment includes deploying a data processing system call interface in a virtual machine in a virtualization environment, the system call interface being configured to trigger a locally called data processing instruction. The method also includes deploying a data processing driver in a virtual machine management platform in the virtualization environment, the data processing driver being configured to read the data processing instruction triggered by the system call interface. Moreover, the method includes deploying a data processing instruction optimizer in the virtualization environment, the optimizer being configured to optimize the data processing instruction read by the deployed data processing driver.

20 Claims, 10 Drawing Sheets

(51) Int. Cl.
*G06F 13/28* (2006.01)
*G06F 9/455* (2006.01)
*G06F 12/16* (2006.01)
*G06F 11/14* (2006.01)

(52) U.S. Cl.
CPC ...... *G06F 12/16* (2013.01); *G06F 2009/4557* (2013.01); *G06F 2009/45583* (2013.01); *G06F 2201/815* (2013.01)

(58) Field of Classification Search
USPC ......................................................... 711/162
See application file for complete search history.

(56) References Cited

U.S. PATENT DOCUMENTS

| | | | | |
|---|---|---|---|---|
| 2004/0015627 | A1* | 1/2004 | Desoli | G06F 9/45504 710/260 |
| 2005/0080753 | A1 | 4/2005 | Vega et al. | |
| 2005/0131958 | A1* | 6/2005 | Rhodes | G06F 11/1464 |
| 2006/0005186 | A1 | 1/2006 | Neil | |
| 2006/0150201 | A1* | 7/2006 | Bendapudi | G06F 9/547 719/328 |
| 2007/0028244 | A1* | 2/2007 | Landis | G06F 9/5016 718/108 |
| 2007/0244940 | A1 | 10/2007 | Devarakonda et al. | |
| 2008/0250415 | A1* | 10/2008 | Illikkal | G06F 9/5077 718/103 |
| 2008/0288940 | A1 | 11/2008 | Adams et al. | |
| 2009/0150510 | A1 | 6/2009 | Kovacs et al. | |
| 2009/0157942 | A1 | 6/2009 | Kulkarni | |
| 2010/0083247 | A1 | 4/2010 | Kanevsky et al. | |
| 2010/0095100 | A1* | 4/2010 | Darrington | G06F 11/1438 712/228 |
| 2011/0191559 | A1 | 8/2011 | Li et al. | |

OTHER PUBLICATIONS

Election/Restriction Requirement from U.S. Appl. No. 13/014,670, dated Jan. 22, 2014.
Final Office Action from U.S. Appl. No. 13/014,670, dated Jun. 5, 2014.
Non-Final Office Action from U.S. Appl. No. 13/014,670, dated Feb. 13, 2014.
Non-Final Office Action from U.S. Appl. No. 13/014,670, dated Jan. 13, 2015.
Notice of Allowance from U.S. Appl. No. 13/014,670, dated May 8, 2015.
Li et al., U.S. Appl. No. 13/014,670, filed Jan. 26, 2011.

* cited by examiner

SYSTEM, METHOD AND COMPUTER PROGRAM PRODUCT FOR DATA PROCESSING AND SYSTEM DEPLOYMENT IN A VIRTUAL ENVIRONMENT

BRIEF SUMMARY

According to one embodiment, a computer program product for deploying a data processing system in a virtual environment includes a computer readable storage medium having computer readable program code embodied therewith. The embodied computer readable program code includes computer readable program code configured to deploy a data processing system call interface in a virtual machine in a virtualization environment, the system call interface being configured to trigger a locally called data processing instruction. The embodied computer readable program code also includes computer readable program code configured to deploy a data processing driver in a virtual machine management platform in the virtualization environment, the data processing driver being configured to read the data processing instruction triggered by the system call interface. Moreover, the embodied computer readable program code includes computer readable program code configured to deploy a data processing instruction optimizer in the virtualization environment, the optimizer being configured to optimize the data processing instruction read by the deployed data processing driver.

In another embodiment, a system includes a virtualization environment hosting at least one virtual machine and at least one virtual machine management platform. The system also includes a processor and logic integrated with and/or executable by the processor. The logic is configured to deploy a data processing system call interface in the at least one virtual machine in the virtualization environment, the system call interface being configured to trigger a locally called data processing instruction. The logic is also configured to deploy a data processing driver in the virtual machine management platform in the virtualization environment, the data processing driver being configured to read the data processing instruction triggered by the system call interface. Moreover, the logic is configured to deploy a data processing instruction optimizer in the virtualization environment, the optimizer being configured to optimize the data processing instruction read by the deployed data processing driver.

According to another embodiment, a method for deploying a data processing system in a virtual environment includes deploying a data processing system call interface in a virtual machine in a virtualization environment, the system call interface being configured to trigger a locally called data processing instruction. The method also includes deploying a data processing driver in a virtual machine management platform in the virtualization environment, the data processing driver being configured to read the data processing instruction triggered by the system call interface. Moreover, the method includes deploying a data processing instruction optimizer in the virtualization environment, the optimizer being configured to optimize the data processing instruction read by the deployed data processing driver.

Other aspects and embodiments of the present invention will become apparent from the following detailed description, which, when taken in conjunction with the drawings, illustrate by way of example the principles of the invention.

DETAILED DESCRIPTION

Figure 1:
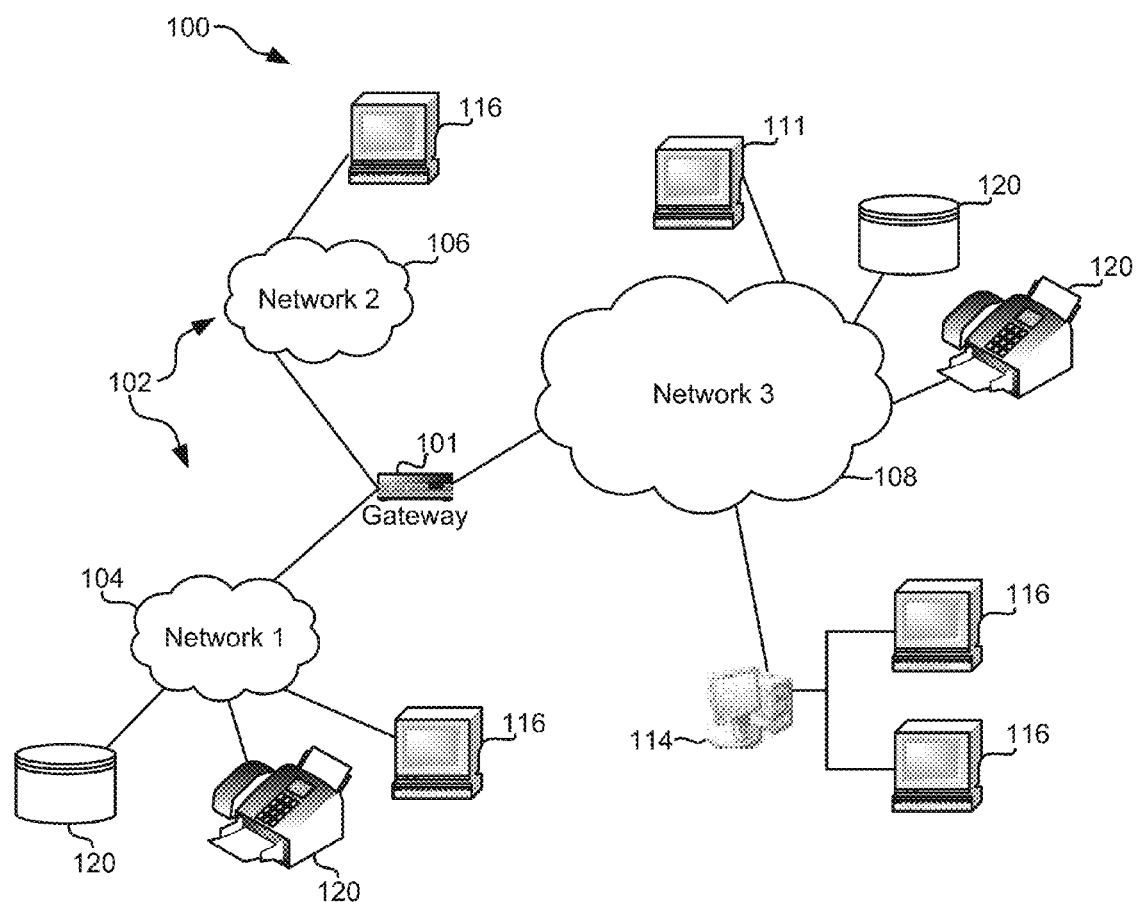
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for performing data backup or data recovery operations in a virtual environment.

In view of the drawbacks recited previously, a data processing method in a virtualization environment, according to one embodiment, may efficiently avoid considerable consumption of virtual network resources. In another embodiment, a data processing method in a virtualization environment is capable of avoiding redundant data backup or data recovery of a plurality of virtualization work units.

According to one embodiment, a data processing method in a virtual environment includes reading a data processing instruction locally called by a virtual work unit, optimizing the read data processing instruction, and performing data processing for the virtual work unit using the optimized data processing instruction.

According to another embodiment, the data processing is data backup processing, and the data processing instruction is a data backup instruction. Performing data processing for a virtual work unit using the optimized data processing instruction includes reading data to be backed up from a shared storage of the virtual work unit and writing the read data to be backed up to a backup storage medium.

According to yet another embodiment, the data processing is data recovery processing, and the data processing instruction is a data recovery instruction. Performing data processing for virtual work unit using the optimized data processing instruction includes reading data to be recovered from a backup storage and writing the read data to be recovered to a shared storage of the virtual work unit.

In another embodiment, a data processing system in a virtual environment includes a module adapted for reading a data processing instruction locally called by a virtual work unit, a module adapted for optimizing the read data processing instruction, and a module adapted for performing data processing for the virtual work unit using the optimized data processing instruction.

In yet another embodiment, the data processing is data backup processing, and the data processing instruction is a data backup instruction. The module adapted for performing data processing for the virtual work unit using the optimized data processing instruction is configured to read data to be backed up from a shared storage of the virtual work unit, and to write the read data to be backed up to a backup storage medium.

According to another embodiment, the data processing is data recovery processing, and the data processing instruction is a data recovery instruction. The module adapted for performing data processing for the virtual work unit using the optimized data processing instruction is configured to read data to be recovered from a backup storage medium, and to write the read data to be recovered to a shared storage medium of the virtual work units.

In another embodiment, a method for deploying a data processing system in a virtualization environment includes deploying a data processing system call interface in a virtual machine in a virtualization environment, the system call interface being for triggering a locally called data processing instruction, deploying a data processing driver in a virtual machine management platform in a virtualization environment, the data processing driver being for reading the data processing instructions triggered by the system call interface, and deploying a data processing instruction optimizer in a virtualization environment, the optimizer being for optimizing the data processing instruction read by the deployed data processing driver.

In one approach, the data processing system call interface is a data backup system call interface, the data processing instruction is a data backup instruction, the data processing driver is a data backup driver, and the data processing instruction optimizer is a data backup instruction optimizer.

In another approach, the data processing system call interface is a data recovery system call interface, the data processing instruction is a data recovery instruction, the data processing driver is a data recovery driver, and the data processing instruction optimizer is a data recovery instruction optimizer.

According to the various embodiments and approaches described herein, when the virtual work units (virtual machines) perform a data processing operation, each virtual work unit does not need to perform a data processing operation through a virtual network, thereby preventing the virtual work units from competing for virtual network resources and from excessive consumption of these resources. Additionally, a suitable optimization policy may be selected to optimize the read data processing instructions, as desired, so as to further achieve a technical effect of avoiding degradation of system performance caused by redundant data processing and excessive competition on the virtual environment or virtual system operation resources.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
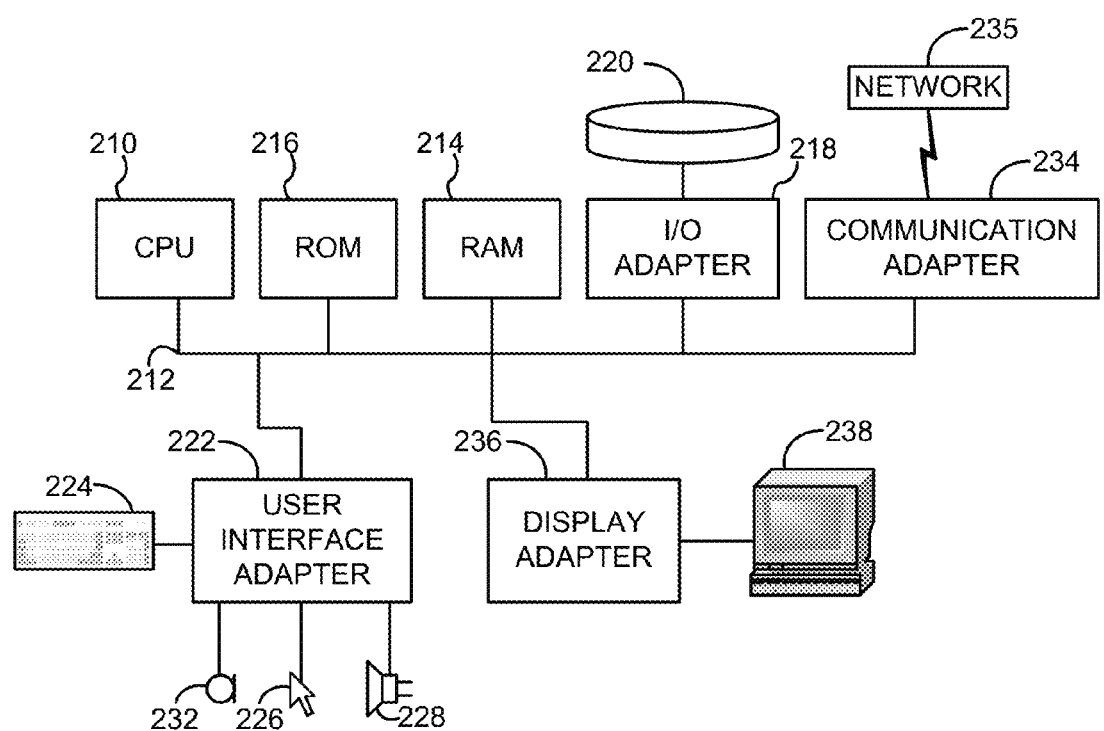
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
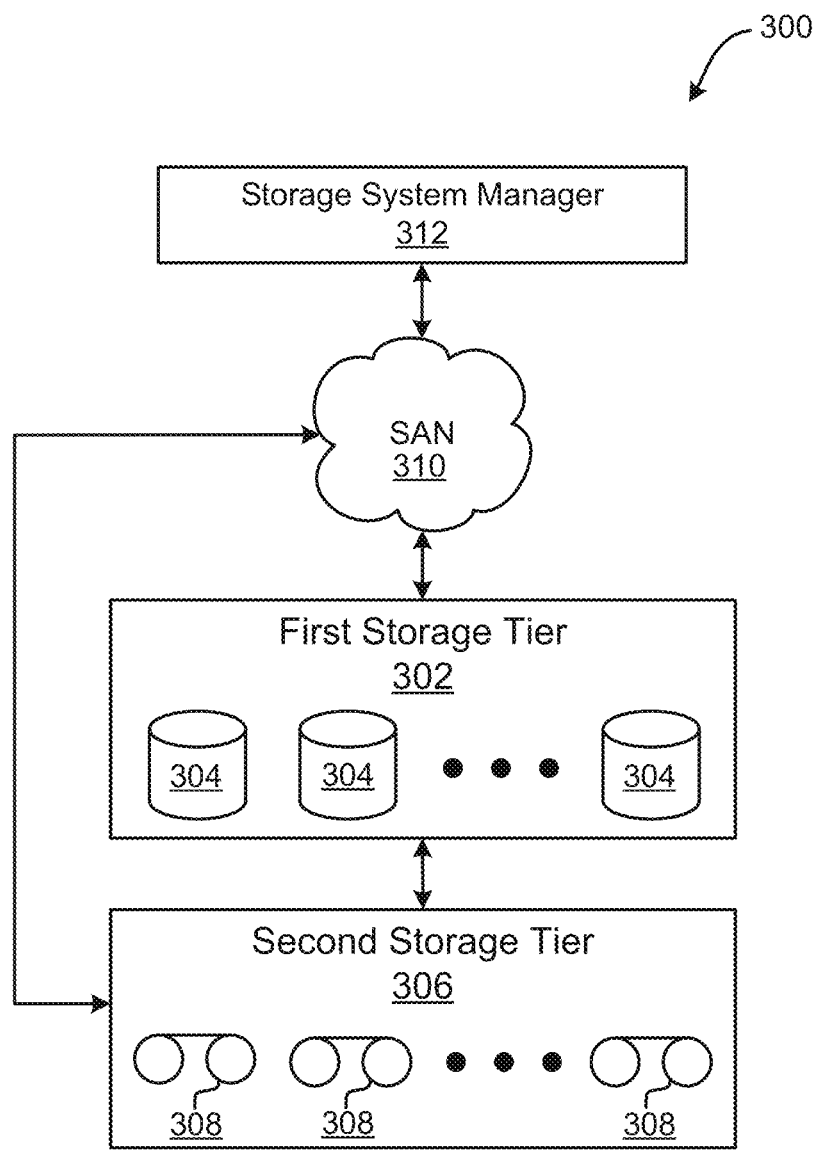
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

Figure 4:
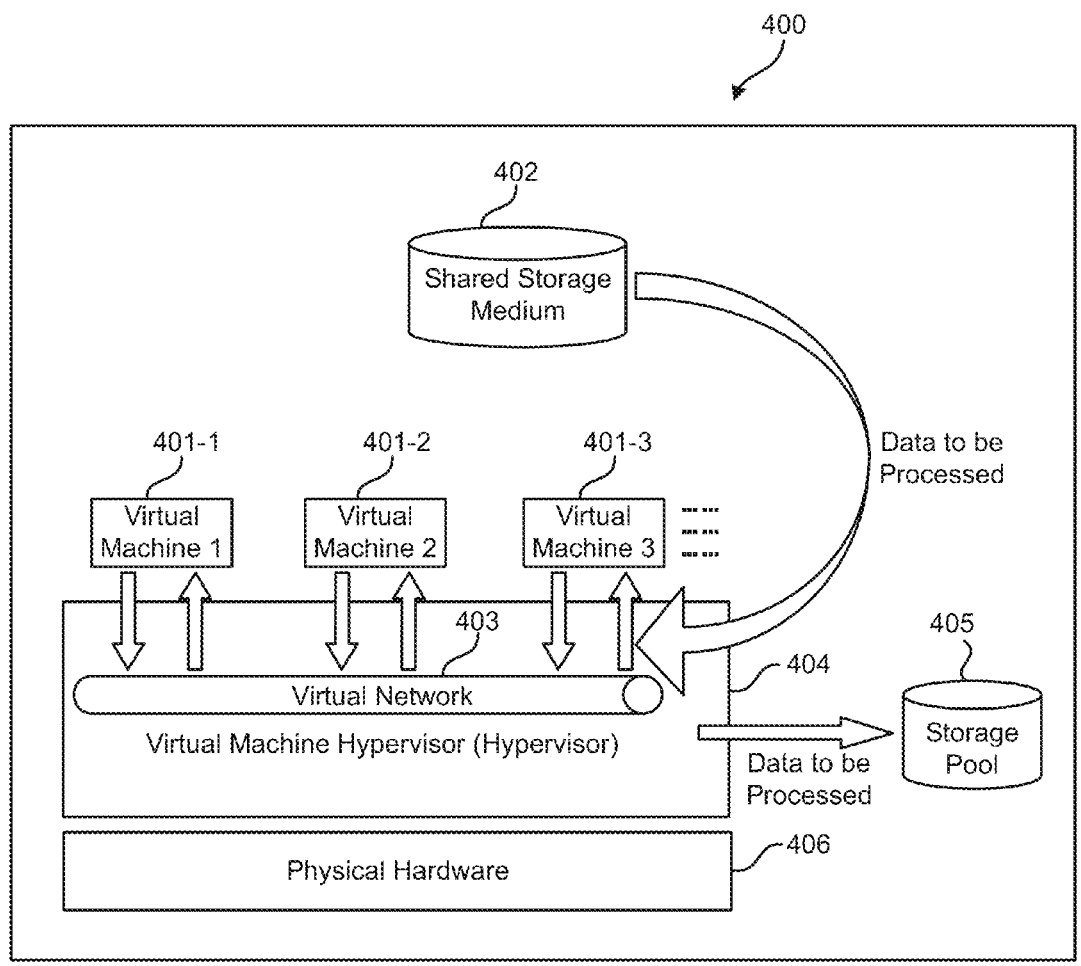
FIG. 4 is a structural diagram of a conventional system for performing data backup or data recovery operations in a virtual environment, according to the prior art.

FIG. 4 is a structural diagram of a conventional system 400 for performing data backup or data recovery operations in a virtual environment, according to the prior art. The system 400 comprises virtual machines 401-1 to 401-3, a virtual machine shared storage medium 402, a virtual network 403, a virtual machine hypervisor 404, a storage pool 405, and physical hardware 406. FIG. 4 shows a detailed data flow with a data backup operation, as an example. In other words, virtual machines 401-1 to 401-3 are to back up data in the shared storage 402 to the storage pool 405. The storage pool 405 may be a remote storage device connected to the physical hardware 406 on which the virtual machines 401-1 and 401-3 reside through a network, such as Ethernet. Specifically, each of the virtual machines 401-1 and 401-3 read data to be backed up from the shared storage 402 through the virtual network 403 which is constructed on the virtual machine hypervisor 404, and then back up the data to be backed up to the storage pool 405, likewise through the virtual network 403 and the physical Ethernet. In other words, when the virtual machines read and back up the data to be backed up, it utilizes the virtual network 403, which will occupy considerable virtual network resources (for example, virtual network card, virtual router, etc). Further, a plurality of virtual machines will compete for precious virtual network resources, causing degradation of system performance. Moreover, each virtual machine, when backing up data, is unaware of whether the same data is backed up by another virtual machine, and there is no mechanism to analyze the data to be backed up of each virtual machine so as to avoid repetitive data backup that may cause wasting of storage space in the storage pool 405 and undue occupation of network transfer resources (including virtual network resources and physical network resources) for transferring repetitive data. It should be noted that the data flow in the system 400 as shown in FIG. 4 is described with respect to data backup operation. When a virtual machine performs a data recovery operation, the system may have a similar structure, just with the data flow reversed.

Figure 5:
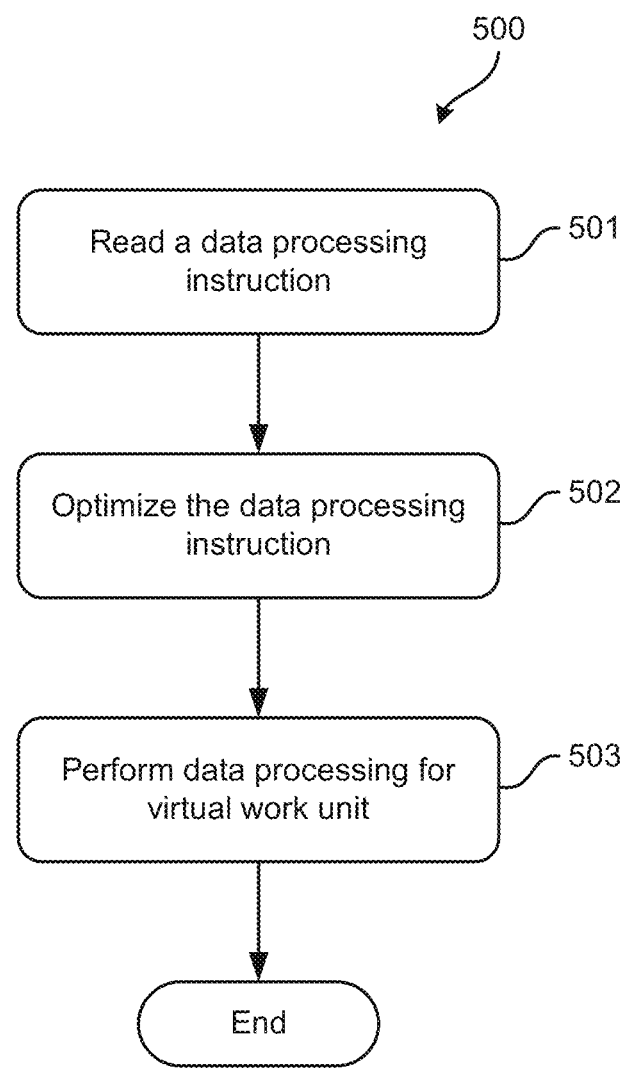
FIG. 5 is a flow chart of a data processing method in a virtual environment according to one embodiment.

FIG. 5 is a flow chart of a data processing method in a virtual environment according to one embodiment. The term "data processing" herein may include data backup and data recovery operations. Those skilled in the art may understand that data backup may refer to a virtual machine backing up data content in a shared storage medium (which may be a hardware storage device shared by a plurality of virtual machines) to other storage media, for example, a remote memory storage pool coupled to a physical machine on which the virtual machine resides through an Ethernet connection, as an example. On the contrary, data recovery refers to a virtual machine recovering data content stored in a storage medium for backup to a shared storage medium of the virtual machine.

In operation 501, a data processing instruction which is called locally by a virtual work unit (similar to the virtual machine as shown in FIG. 4) is read. The read locally called data processing instruction may be a data processing instruction generated by a backup client in the virtual work unit ("a virtual work unit" herein may be understood as having a same or similar meaning as technical terms such as "a virtual machine," "a virtual work station," etc.) by adding an application programming interface (API) interface to the virtual machine so as to increase hypercall. Hypercall is a basic mechanism for implementing a system call by a virtual machine system or a virtual environment. To add a corresponding hypercall based on the type of data processing, only three steps are executed for adding a new virtual machine system call: registering a new system call number, updating a system call table, and adding a new function. Those skilled in the art should understand that a plurality of methods may be adopted to add a new system call in a virtual machine, and the embodiments described herein are not limited to these three steps described above. The method in which a new system call is added in a virtual environment may depend on, among other things, a particular embodiment of the virtual environment, a requirement of a user of a virtual machine, etc. Any method in which a new system call (e.g., hypercall) is added falls within the scope of the present invention. The reason for adding a new system call (hypercall) is that the data processing instruction generated by a hypercall will be a locally called instruction which is transferred through a virtual machine hypervisor, without needing to send a data processing request to a shared storage medium via a virtual network or transferring the data to be processed via the virtual network. In this way, precious virtual network resources are saved.

In one embodiment, each virtual machine may be added as an API interface for a hypercall, such that each virtual machine sends a data processing instruction via a local call. Those skilled in the art should understand, dependent on different specific virtual environments, an API interface for hypercall may be defined in a virtual machine in many different ways, and the capability of triggering a locally called data processing instruction (including data backup and data recovery) through the hypercall interface is an objective of using a hypercall, according to some approaches. The locally called data processing instruction is transferred via the virtual machine hypervisor, and then is read at operation 501.

It should be further noted that the data processing instruction may be read in several ways. According to one embodiment, the data processing instruction may be read in a predetermined interval, for example, every 15 seconds, every 10 seconds, every 5 seconds, etc. According to another embodiment, the data processing instruction may be read based on a predetermined number of instructions, for example, every 20 pieces of data processing instructions, every 10 pieces, every 5 pieces, etc. Any way in which the locally called data processing instruction is read falls within the scope of the present invention, according to various embodiments.

A data backup instruction at least comprises three kinds of information, in one approach: information on data to be backed up, information on backup storage destination, and information on backup policy. An example for data processing instructions according to one embodiment may be: Backup("/usr/lib/*", "9.186.63.121:/archive", "full"), wherein "backup" indicates that these data processing instructions are to perform data backup operations, "9.186.63.121:/archive" indicates a backup storage destination, and "full" indicates that the backup policy is "full backup" (possible backup policies may further include differential backup, incremental backup, etc.). It should be noted that the specific form of data processing instructions or hypercall is related to a specific embodiment of a virtual environment. Any form or format by which a data processing instruction or hypercall is expressed falls within the scope of the present invention.

In operation 502, the read data processing instruction is optimized. It should be noted that since there are typically a plurality of virtual machines in a virtual environment, it is possible that a plurality of data processing instructions from a plurality of virtual machines are read at operation 501. Accordingly, optimization may also be performed with respect to the plurality of data processing instructions from a plurality of virtual machines at operation 502. Of course, those skilled in the art should understand that if there is only one virtual machine or there is only one virtual machine that sends a data processing instruction, the data processing instruction may also be read at operation 501, and be optimized at operation 502.

Further, "optimization" may be performed based on a plurality of optimization policies. According to an optimization policy in one embodiment, the data processing instructions on same data from different virtual work units may be merged. That is, if it is determined through analysis that a plurality of data processing instructions sent from different virtual work units involve processing the same data content (for example, some parts of the data contents to be backed up by a plurality of virtual work units are the same), then the parts involving same data content in these data processing instructions are merged, thereby avoiding repetitive data processing operations on same data content.

According to an optimization policy in another embodiment, data processing instructions from different virtual work units may be analyzed so as to select a suitable data processing timing. That is, if the virtual environment or virtual system is processing other operations and occupying considerable system resources when the virtual work unit sends the data processing instruction through hypercall, then the data processing operation for the virtual work unit is suspended and will be performed at a selected suitable timing, in one example. In this way, excessive competition on operation resources in a virtual environment may be avoided.

According to a another optimization policy in one embodiment, the read data processing instruction may not be processed, and may be directly taken as an optimized data processing instruction to perform data processing operation for the virtual work unit. In other words, according to one embodiment, it is also an optimization policy that the read data processing instruction is not processed and directly used to perform data processing operation for the virtual work unit. The plurality of possible optimization policies as set forth above are presented only for illustrating a technical solution, according to various embodiments, more clearly, without limiting the optimization or optimization policies possible in the scope of the invention. Any optimization policy falls within the scope of the present invention.

In operation 503, the optimized data processing instruction is utilized to perform data processing for the virtual work unit. According to one embodiment, the data processing may refer to data backup. According to another embodiment, the data processing may refer to data recovery. These two embodiments are described in detail with reference to FIGS. 6 and 7.

With method 500 as shown in FIG. 5, when a virtual work unit (virtual machine) is performing data processing operation, the data processing operation is uniformly performed for virtual work units by reading the data processing instruction which are locally called by the virtual work units, without performing data processing operations by respective work units through a virtual network, respectively, thereby preventing virtual work units from competing on and excessively consuming virtual network resources. Meanwhile, a suitable optimization policy may be selected to optimize a read data processing instruction as desired so as to further achieve a technical effect of avoiding degradation of system performance due to redundant data processing and excessive competition on the virtual environment or virtual system operation resource.

Figure 6:
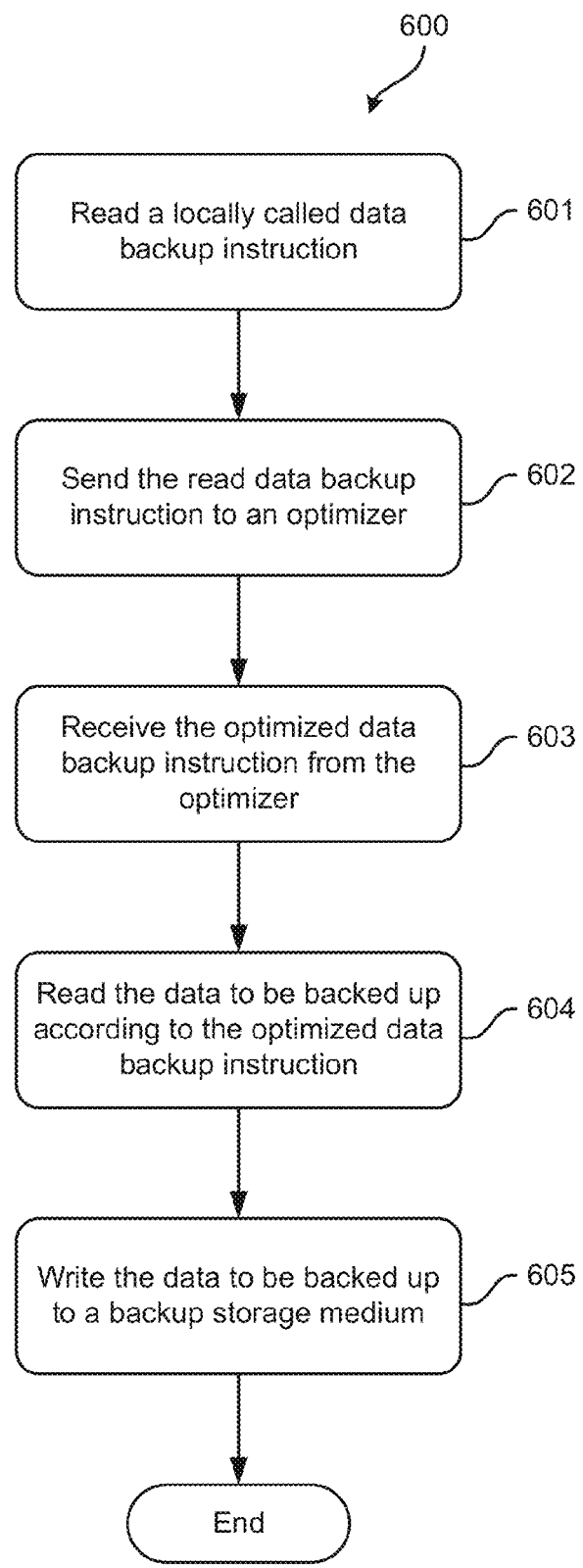
FIG. 6 is a flow chart of a data processing method in a virtual environment according to another embodiment.

FIG. 6 is a flow chart of a data processing method 600 in a virtual environment according to one embodiment. Specifically, FIG. 6 shows a flow chart of a data processing method 600 in a case where data processing comprises data backup processing.

Operation 601 corresponds to operation 501 in FIG. 5, and in operation 601 of FIG. 6, a locally called data backup instruction is read. Operation 602 and 603 correspond to step 502 in FIG. 5. In operation 602 of FIG. 6, the read data backup instruction is sent to an optimizer.

It should be noted that specific optimization may be implemented by an individual optimizer or implemented by a module or mechanism adapted for reading the locally called data processing instructions. Depiction of "optimizer" at operation 602 and 603 is only for depicting embodiments more clearly, and it does not mean that the optimizer is a different module or mechanism from the module or mechanism adapted for reading the locally called data backup instructions in operation 601, from the module or mechanism adapted for reading the locally called data processing instructions in operation 501 in FIG. 5, or from the module or mechanism adapted for reading the locally called data recovery instructions in operation 701 of FIG. 7. In other words, operations 602 and 603 in FIG. 6 are not necessary steps, according to several embodiments. If the module or mechanism adapted for reading data processing instructions locally called by a virtual work unit is the same module or mechanism adapted for performing optimization, then operations 602 and 603 are unnecessary.

Next, operation 604 and 605 correspond to operation 503 in FIG. 5. At operation 604 in FIG. 6, the data to be backed up is read based on the optimized data backup instruction. According to one embodiment, the data to be backed up of a virtual work unit refer to data in a shared storage medium of the virtual machine. At operation 605, the read data to be backed up is written to a backup storage medium.

According to one approach, backup storage medium may be a remote storage device communicating with a physical machine (physical hardware) on which the virtual work units reside through a network, such as Ethernet. According to another embodiment, the backup storage medium may be a plug-pull portable storage device communicating with a physical machine (physical hardware) on which the virtual work units reside through a communication interface, such as USB interface, "Firewire" 1394 interface, an optical driver, etc. Those skilled in the art should understand that the backup storage medium merely represents a destination for backing up data, and any form of storage medium, device, recipient, etc., may be used, as long as it becomes a destination for the data to be backed up.

With method 600 as shown in FIG. 6, when a virtual work unit (virtual machine) is performing a data backup operation, the data backup operation is uniformly performed for the virtual work unit by reading data backup instructions locally called by the virtual work unit, without performing data backup operations by respective work unit through a virtual network, respectively, thereby preventing virtual work units from competing on and excessively consuming virtual network resources. Meanwhile, a suitable optimization policy may be selected to optimize a read data backup instruction as desired so as to further achieve a technical effect of avoiding degradation of system performance due to redundant data backup and excessive competition on the virtual environment or virtual system operation resource.

Figure 7:
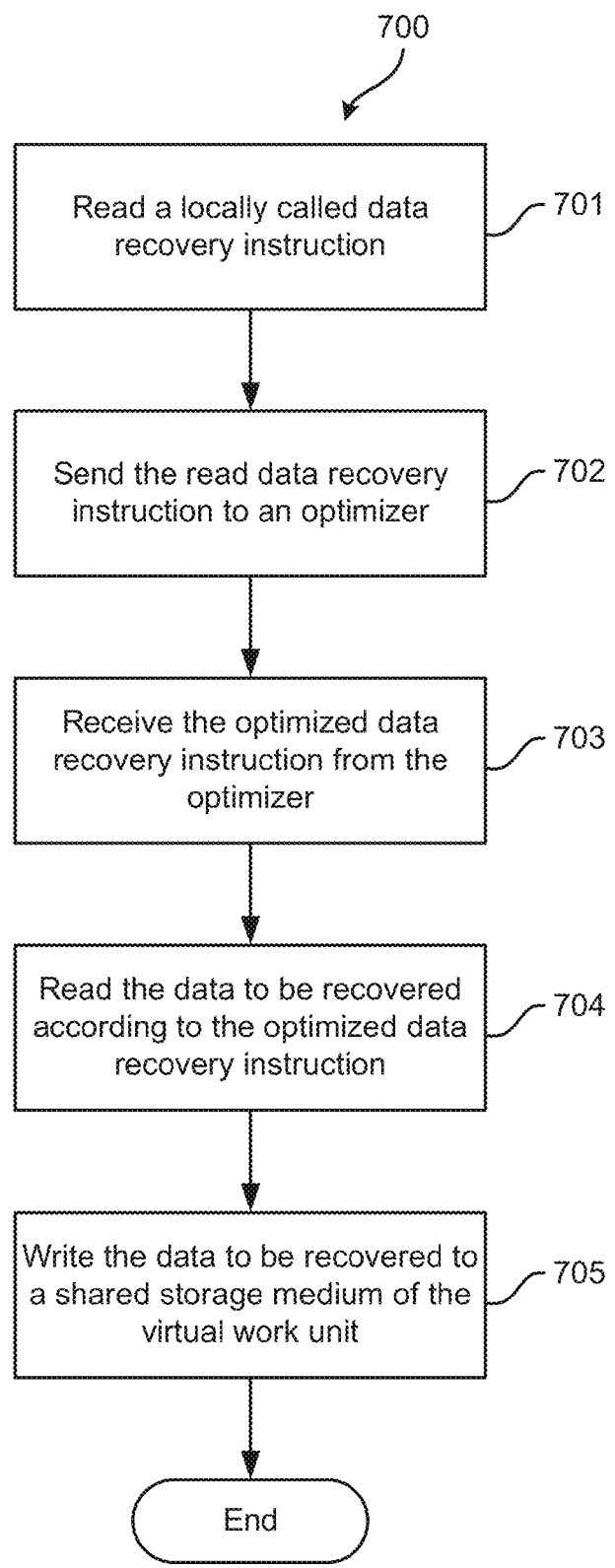
FIG. 7 is a flow chart of a data recovery method in a virtual environment according to yet another embodiment.

FIG. 7 is a flow chart of a data processing method 700 in a virtual environment according to another embodiment. Specifically, FIG. 7 shows a flow chart of a data processing method 700 in a case where data processing comprises data recovery processing. Operation 701 corresponds to operation 501 of FIG. 5 and operation 601 of FIG. 6. At operation 701 of FIG. 7, a data recovery instruction as locally called by a virtual work unit is read. Operation 702 and operation 703 correspond to operation 502 in FIG. 5. At operation 702 in FIG. 7, the read data recovery instruction is sent to an optimizer. Likewise, specific optimization may be implemented by an individual optimizer or implemented by a module or mechanism adapted for reading the locally called data processing instructions. Depiction of "optimizer" at operation 702 and operation 703 is only for describing embodiments more clearly. Therefore, similar to the above depiction of FIG. 6, operation 702 and operation 703 in FIG. 7 are also mandatory operations in the case where data processing comprises data recovery.

Operation 704 and operation 705 correspond to operation 503 in FIG. 5. At operation 704 in FIG. 7, the data to be recovered is read according to the optimized data recovery instruction. According to one embodiment, the data to be recovered of virtual work units refers to data stored in the backup storage medium. At operation 705, the read data to be recovered is written to a shared storage medium of the virtual work unit. Accordingly, compared with FIG. 6, the difference of respective operations in FIG. 7 lies mainly in data flow. The data flow in the data backup method of FIG. 6 is from a shared storage medium of the virtual work unit to a backup storage medium, while the data flow in the data backup method of FIG. 7 is from a backup storage medium to a shared storage medium of the virtual work unit.

With method 700 as shown in FIG. 7, when a virtual work unit (virtual machine) is performing a data recovery operation, the data recovery operation is uniformly performed for a virtual work unit by reading data recovery instructions locally called by the virtual work units, without performing data recovery operations by a respective work unit through a virtual network, respectively, thereby preventing virtual work units from competing on and excessively consuming virtual network resources, in preferred embodiments. Meanwhile, a suitable optimization policy may be selected to optimize the read data recovery instructions as desired so as to further achieve a technical effect of avoiding degradation of system performance due to redundant data recovery and excessive competition on the virtual environment or virtual system operation resources, in most approaches.

Figure 8:
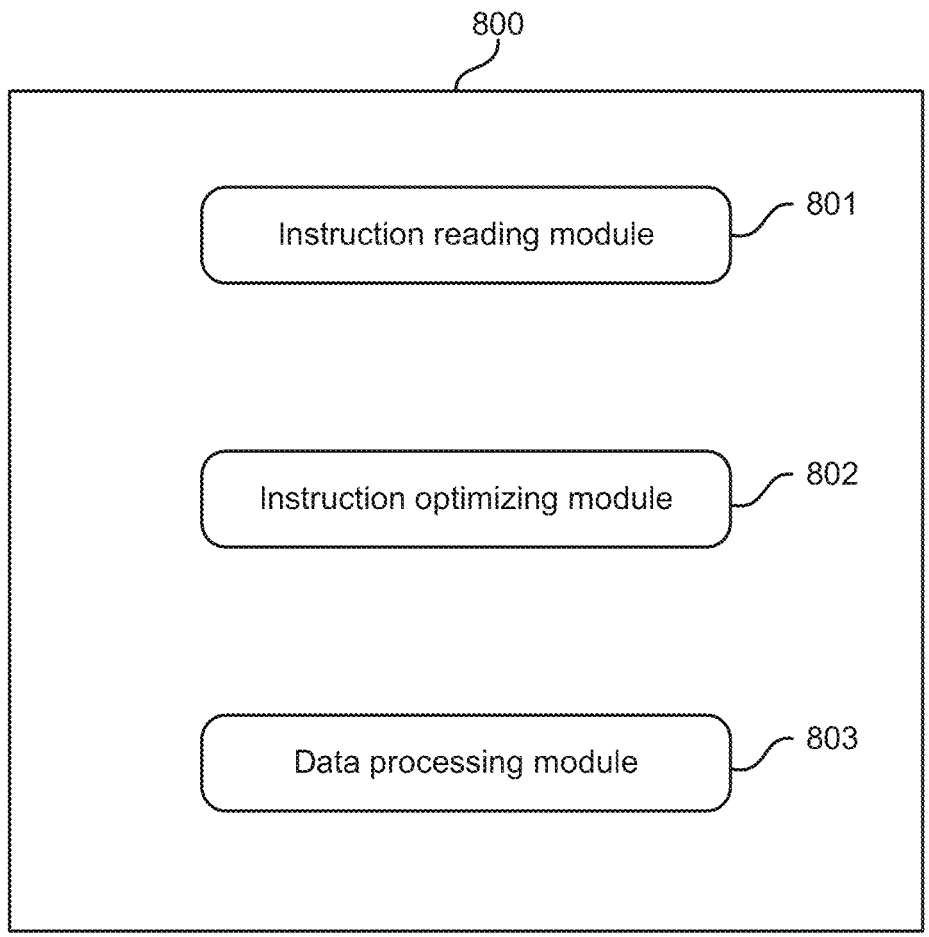
FIG. 8 is a structural diagram of a data processing system in a virtual environment according to one embodiment.

FIG. 8 is a structural diagram of a data processing system 800 in a virtual environment, according to one embodiment. The system 800 comprises an instruction reading module or mechanism 801 adapted for reading data processing instructions locally called by a virtual work unit, an instruction optimizing module or mechanism 802 adapted for optimizing the read data processing instructions, and a data processing module or mechanism 803 adapted for performing corresponding data processing operations for the virtual work units by using the optimized data processing instructions. Those skilled in the art may understand that the system 800 as a whole may correspond to method 400 as shown in FIG. 4. Referring again to FIG. 8, specifically, the instruction reading module or mechanism 801, instruction optimizing module or mechanism 802, and data processing module or mechanism 803 may be understood to correspond to operations 401, 402, and 403 of FIG. 4, respectively.

Figure 9:
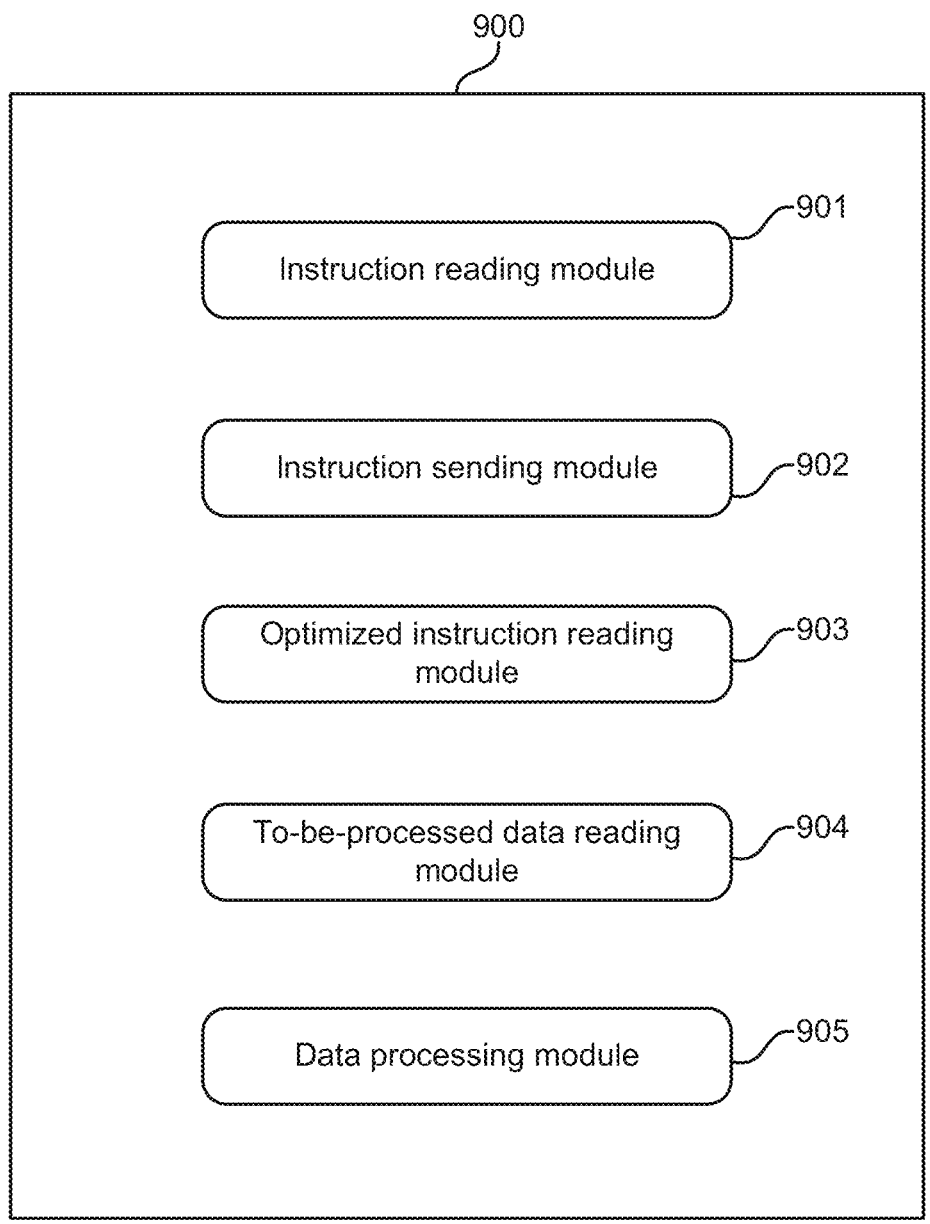
FIG. 9 is a structural diagram of a system for performing data backup or data recovery operations in a virtual environment according to one embodiment.

FIG. 9 is a structural diagram of a system 900 for performing data backup or data recovery operations in a virtual environment according to another embodiment. The system 900 comprises instruction reading module or mechanism 901, instruction sending module or mechanism 902, optimized instruction receiving module or mechanism 903, to-be-processed data reading module or mechanism 904, and data processing module or mechanism 905.

The instruction reading module or mechanism 901 may be understood to correspond to operation 601 of FIG. 6 or operation 701 of FIG. 7, and may be adapted for reading data processing instructions locally called by the virtual work unit. Referring again to FIG. 9, the instruction sending module or mechanism 902 may be understood to correspond to operation 602 of FIG. 6 or operation 702 of FIG. 7, and may be adapted for sending the read data processing instructions to the optimizer. Referring once again to FIG. 9, the optimized instruction module or mechanism 903 may be understood to correspond to operation 603 of FIG. 6 or operation 703 of FIG. 7, and may be adapted for receiving the optimized data processing instructions from the optimizer. It should be noted that from the above depiction with reference to FIGS. 6-7 and 9, it is seen that the instruction sending module or mechanism 902 and optimized instruction receiving module or mechanism 903 are not mandatory elements.

The to-be-processed data reading module or mechanism 904 may be understood to correspond to operation 604 of FIG. 6 or operation 704 of FIG. 7, and may be adapted for reading the data to be processed according to the optimized data processing instructions. Referring again to FIG. 9, according to one embodiment, the data processing instructions may be data backup instructions, thus the to-be-processed data reading module or mechanism 904 reads the data to be backed up of virtual work units from a shared storage medium of the virtual work units. Correspondingly, the data processing module or mechanism 905 writes the data to be backed up to the backup storage medium. According to another embodiment, the data processing instructions may be data recovery instructions, thus the to-be-processed data reading module or mechanism 904 reads the data to be recovered from the virtual work units. Correspondingly, the data processing module or mechanism 905 writes the data to be recovered to the shared storage medium of virtual work units.

Figure 10:
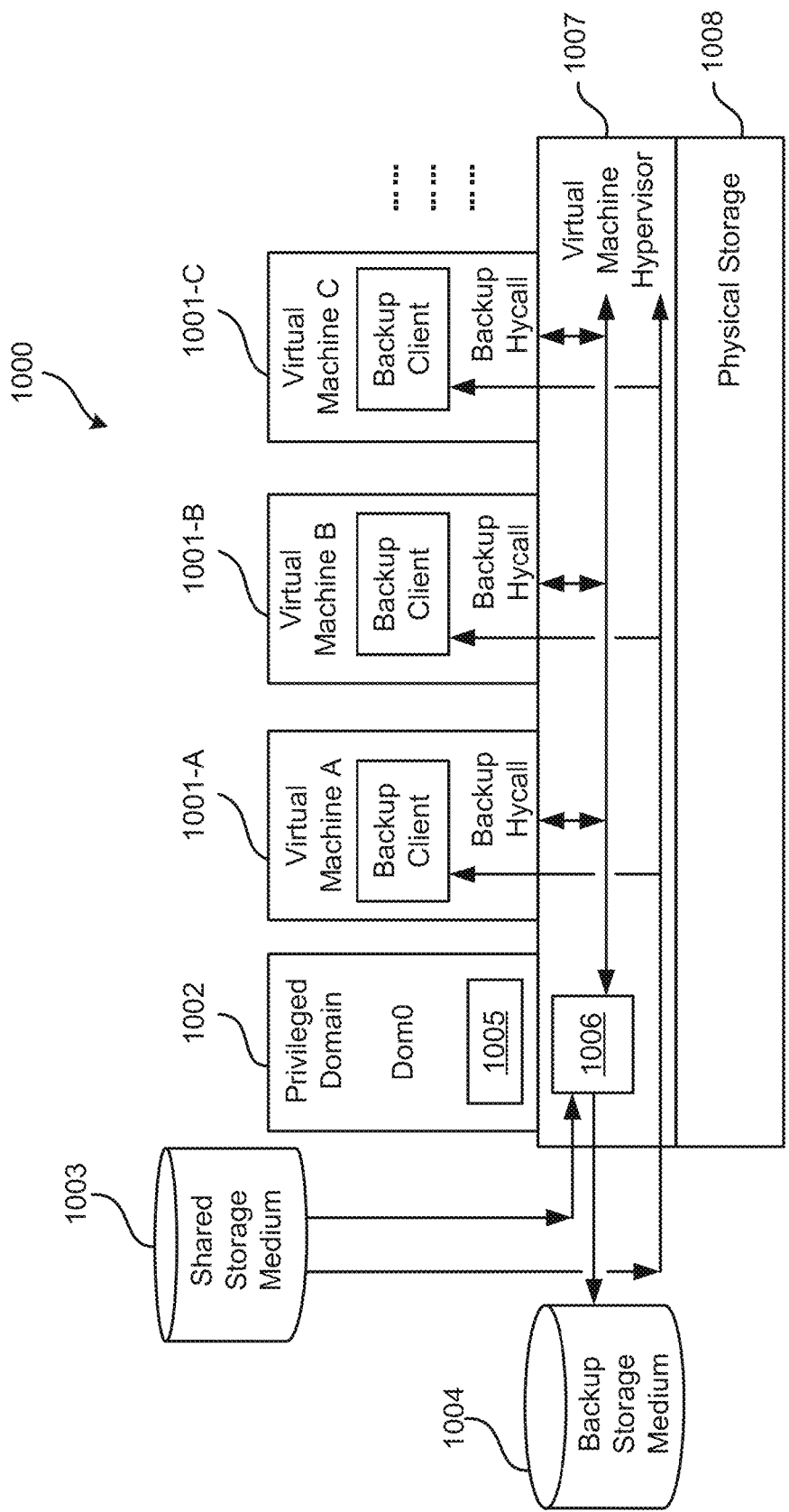
FIG. 10 is a detailed architecture diagram of a data processing system in a virtual environment according to one embodiment.

FIG. 10 is a detailed architecture diagram of a data backup system 1000 in a virtual environment according to one embodiment, with Xen API as an example. The system 1000 comprises virtual machine A, virtual machine B, and virtual machine C, as indicated by 1001-A to 1001-C, respectively, which correspond to virtual work units. However, any number of virtual machines may be used, and the invention is not limited to only three machines, as 1, 5, 10, 50, etc., virtual machines and/or virtual work units may be used, in various embodiments. Each virtual work unit comprises a backup client and a backup Hycall. The backup Hycall is just the hypercall as mentioned above, in some approaches. A client operation system and an application running thereon are referred to as a domain, wherein a privileged domain Dom0 is responsible for managing other virtual machines, for example, creating, destroying, suspending, recovery, etc. Other non-privileged virtual domains are referred as DomU, where 1001-A to 1001-C in FIG. 10 may be regarded as three DomU. Domain 1002 as shown in FIG. 10 is a privileged domain Dom0. All data flow to or from the virtual machines must go through the privileged domain Dom0 1002 which is an agent for the virtual machines to access read hardware. The shared storage medium 1003 as shown in FIG. 10 is a storage space, comprising one or more storage media, shared by respective virtual machines 1001-A to 1001-C. The backup storage medium 1004 is the backup destination comprising one or more backup media where the virtual machines 1001-A to 1001-C back up data in the shared storage medium. As mentioned above, backup storage medium 1004 may either be a remote storage device communicating with the physical hardware 1008 on which the virtual machines reside through the Ethernet, a portable storage device, etc.

The system as shown in FIG. 10 further comprises a backup optimizer 1005 located in the privileged domain Dom0 1002, a virtual machine hypervisor 1007, a backup driver 1006 in the virtual machine hypervisor 1007, and real physical hardware 1008 on which the virtual machines reside. It should be noted that the virtual machine hypervisor 1007 is essentially a virtual machine management platform, which may also be referred as a virtual machine manager (VMM) or virtual machine management platform, in some virtual environments. In other words, a layer of virtual machine manager or virtual machine monitor is set up on a real hardware platform, and then the client operation system of the virtual machines may be started by the virtual machine manager or virtual machine monitor. The flow for the system 1000 for implementing a virtual machine data backup operation as shown in FIG. 10 is specified as follows.

Firstly, users of virtual machines 1001-A to 1001-C decide to perform backup operation to the data of the three virtual machines, and then backup metadata of the three virtual machines are read from the shared storage medium 1003 in the three virtual machines, respectively. "Backup metadata" refers to the data for describing data to be backed up. For example, backup metadata may comprise the following information: backup destination, backup type (full backup, differential backup, incremental backup, etc.), etc. Backup metadata may be pre-defined and stored by a user of each virtual machine, which may be either stored in the shared storage medium 1003 or stored wherever it may be accessed. Alternatively, backup metadata may be directly transferred to the Hycall (i.e., a backup hypercall of each virtual machine in FIG. 10) as a parameter when the user determines that it is to be backed up, as long as the backup client in the virtual machine can access or be aware of the operation.

Whether to pre-define backup metadata and where to store the backup metadata may depend on a specific embodiment, which does not constitute a limitation to the scope of the present invention. FIG. 10 merely depicts the technical solution with an example that the backup metadata information is stored in the shared storage medium 1003. The backup client of the virtual machines in FIG. 10, after reading the backup metadata, immediately issues a locally called data backup instruction to the virtual machine hypervisor 1007 via the backup Hycall in the virtual machine, in one approach. The method of adding a backup Hycall to each virtual machine and performing a local Hycall has been introduced in detail in the above depiction with reference to FIGS. 2-3, according to one embodiment, which will not be detailed here. The local called instruction as shown in FIG. 10 is transmitted via a virtual machine system call, instead of being transmitted by virtual network Vnet, such that the local system call only occupies very few system resources compared to transmitting backup data via the virtual network.

Next, the backup driver 1006 reads, according to a predetermined rule, the data backup instructions called locally by the three virtual machines, where the predetermined rule may be reading regularly, reading every certain number of instructions, reading in any other predetermined manner, etc. Then, the backup driver 1006 sends the read data backup instructions to the backup optimizer 1005 in the privileged domain 1002, where the backup optimizer performs optimization processing on the data backup instructions. It should be noted that the backup optimizer 1005 being in the privileged domain 1002 is only an embodiment for the sake of providing a better interactive interface, such that the use may easily insert an optimization backup policy and algorithm in his favor. In fact, the backup driver 1006 and backup optimizer 1005 may also be in a particular virtual machine (DomU) to work. Further, the backup driver 1006 and the backup optimizer 1005 may also be integrated into one, e.g., the backup driver 1006 per se has a function of optimizing the read data backup instructions.

It should be further noted that as mentioned in the description with reference to FIGS. 2-3, there may be a varied of policies for "optimization", including merging redundant backup data, selecting a suitable backup time, etc.

Besides, the backup driver 1006 in FIG. 10 may perform data backup operation for the virtual machines by utilizing the data backup instructions, without performing any processing on the read data backup instructions, which is also a special optimization policy.

Continuously with the system architecture of FIG. 10 as an example, after the backup optimizer 1005 completes optimization to the data backup instructions, it sends the optimized data backup instructions to the backup driver 1006. With the optimized data backup instructions, the backup driver 1006 reads the data to be backed up from the shared storage 1003, and then writes the read data to be backed up to the backup storage 1004, thereby completing the data backup operation of virtual machines 1001-A to 1001-C. For the sake of simplicity, FIG. 10 only shows a backup storage medium 1004. In fact, each virtual machine may set its own different storage destination. That is to say, there may be a plurality of different backup storage media 1004. It is through the virtual network Vnet that the backup driver 1006 reads the data to be backed up from the shared storage medium 1003, while it is through the virtual network Vnet and a real physical network that the backup driver 1006 writes the data to be backed up to the backup storage medium 1004 (if the backup storage medium 1004 is a remote storage medium). The relationship between the virtual network Vnet and the real physical network may be understood as the virtual machines being in connection and communication with the real physical network via the Vnet.

From system 1000 of FIG. 10 and the above description, it is seen that different from a conventional data backup system as shown in FIG. 4, the virtual machines 1001-A to 1001-C in FIG. 10 do not need considerable data reading to be backed up through the virtual network and physical network and then writing the data to be backed up to the backup storage through the virtual network and physical network.

Instead, with the system 1000 of FIG. 10, since a data backup request of a virtual machine directly issues a data backup instruction via a local call, the data transferred to each virtual machine through the network is only limited to very little data backup metadata information. The subsequent data to be backed up is directly intercepted by the backup driver 1006 which directly writes to the backup storage 1004, without entering into each virtual machine through the virtual network. In this way, considerable virtual network resources are saved, potential network congestion phenomenon occurring during a data backup operation is prevented, and the system performance and operation efficiency are increased. Meanwhile, since the backup driver 1006 may read data backup instructions for each virtual machine, it may optimize these instructions comprehensively based on an optimization policy, thereby achieving a plurality of technical effects of improving system running efficiency and saving system storage resources, such as preventing possible redundant backup, selecting a suitable backup timing, etc.

It should be further noted that FIG. 10 shows a data flow with data backup operations as an example and the description of such has been provided above. Those skilled in the art should note that the same system architecture may be used for data recovery operations, just with a reverse data flow (from the backup storage 1004 to the shared storage 1003), and a similar technical effect may also be achieved.

Though the system 1000 of FIG. 10 shows an embodiment of a data backup operation system in a virtualization environment, those skilled in the art may deploy a system similar to that as shown in FIG. 10 in a conventional virtualization environment. Deployment operations may include deploying a data processing system call interface in a virtual machine in a conventional virtualization environment, the system call interface being for triggering locally called data processing instructions, deploying a data processing driver in a virtualization management platform in a virtualization environment, the data processing driver being for reading data processing instructions triggered by the system call interface, deploying a data processing instruction optimizer in a virtualization environment, the optimizer being for optimizing data processing instructions read by the deployed data processing driver. These deployment operations have no sequence requirement. By virtue of these deployment operations, a data processing service that may save network resources and storage resources and improve system performance as mentioned above may be provided on the basis of a conventional virtualization environment. According to one embodiment, data processing refers to data backup. According to another embodiment, data processing refers to data recovery.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for deploying a data processing system in a virtual environment, the computer program product comprising a computer readable storage medium having computer readable program code embodied therewith, the embodied computer readable program code comprising:
    computer readable program code configured to deploy a data processing system call interface in a virtual machine in a virtualization environment, the system call interface being configured to trigger a locally-called data processing instruction;
    computer readable program code configured to deploy a data processing driver in a virtual machine management platform in the virtualization environment, the data processing driver being configured to read the locally-called data processing instruction triggered by the system call interface; and computer readable program code configured to deploy a data processing instruction optimizer in the virtualization environment, the optimizer being configured to optimize the locally-called data processing instruction read by the deployed data processing driver by:
  analyzing data processing instructions from one or more different virtual machines in the virtual environment to select suitable data processing timing to create an optimized data processing instruction, the suitable data processing timing being selected to avoid competition for operation resources that are used to execute the optimized data processing instruction and are being utilized by the one or more different virtual machines, wherein the operation resources include at least processing power; and
  merging data processing instructions from the one or more different virtual machines with the locally-called data processing instruction in response to a determination that data processing instructions from the one or more different virtual machines and the locally-called data processing instruction are for same data in the virtual environment.

2. The computer program product according to claim 1, wherein there is no sequence requirement for execution of the computer readable program code configured to deploy the data processing system call interface, the data processing driver, and the data processing instruction optimizer.

3. The method according to claim 1, wherein the computer readable program code configured to deploy the data processing system call interface in the virtual machine in the virtualization environment comprises:
  computer readable program code configured to register a new system call number;
  computer readable program code configured to update a system call sheet; and
  computer readable program code configured to add a new function.

4. The method according to claim 1, wherein the data processing system call interface comprises a data backup system call interface in response to the data processing instruction being a data backup instruction, and a data recovery system call interface in response to the data processing instruction being a data recovery instruction.

5. The method according to claim 4, wherein the data processing driver is a data backup driver and the data processing instruction optimizer is a data backup instruction optimizer in response to the data processing system call interface being a data backup system call interface.

6. The method according to claim 4, wherein the data processing driver is a data recovery driver and the data processing instruction optimizer is a data recovery instruction optimizer in response to the data processing system call interface being a data recovery system call interface.

7. The method according to claim 1, wherein the data processing instruction is called according to data processing metadata defined by the virtual machine.

8. A data processing system, comprising:
  a virtualization environment hosting at least one virtual machine and at least one virtual machine management platform; and
  a processor and logic integrated with and/or executable by the processor, the logic being configured to:
    deploy a data processing system call interface in the at least one virtual machine in the virtualization environment, the system call interface being configured to trigger a locally: called data processing instruction;
    deploy a data processing driver in the virtual machine management platform in the virtualization environment, the data processing driver being configured to read the locally-called data processing instruction triggered by the system call interface; and
    deploy a data processing instruction optimizer in the virtualization environment, the optimizer being configured to optimize the locally-called data processing instruction read by the deployed data processing driver by:
      analyzing data processing instructions from one or more different virtual machines in the virtual environment to select suitable data processing timing to create an optimized data processing instruction, the suitable data processing timing being selected to avoid competition for operation resources that are used to execute the optimized data processing instruction and are being utilized by the one or more different virtual machines, wherein the operation resources include at least processing power; and
      merging data processing instructions from the one or more different virtual machines with the locally-called data processing instruction in response to a determination that data processing instructions from the one or more different virtual machines and the locally-called data processing instruction are for same data in the virtual environment.

9. The system according to claim 8, wherein there is no sequence requirement for execution of the logic configured to deploy the data processing system call interface, the data processing driver, and the data processing instruction optimizer.

10. The system according to claim 8, wherein the data processing instruction is called according to data processing metadata defined by the virtual machine, and wherein the logic configured to deploy the data processing system call interface in the virtual machine in the virtualization environment is further configured to:
  register a new system call number;
  update a system call sheet; and
  add a new function.

11. The system according to claim 8, wherein the data processing system call interface comprises a data backup system call interface in response to the data processing instruction being a data backup instruction, and a data recovery system call interface in response to the data processing instruction being a data recovery instruction.

12. The system according to claim 11, wherein the data processing driver is a data backup driver and the data processing instruction optimizer is a data backup instruction optimizer in response to the data processing system call interface being a data backup system call interface.

13. The system according to claim 11, wherein the data processing driver is a data recovery driver and the data processing instruction optimizer is a data recovery instruction optimizer in response to the data processing system call interface being a data recovery system call interface.

14. A method for deploying a data processing system in a virtual environment, the method comprising:
  deploying a data processing system call interface in a virtual machine in a virtualization environment, the system call interface being configured to trigger a locally-called data processing instruction;
  deploying a data processing driver in a virtual machine management platform in the virtualization environment, the data processing driver being configured to read the locally-called data processing instruction triggered by the system call interface; and deploying a data processing instruction optimizer in the virtualization environment, the optimizer being configured to optimize the locally-called data processing instruction read by the deployed data processing driver by:

analyzing data processing instructions from one or more different virtual machines to select suitable data processing timing to create an optimized data processing instruction, the suitable data processing timing being selected to avoid competition for operation resources that are used to execute the optimized data processing instruction and are being utilized by the one or more different virtual machines in the virtual environment, wherein the operation resources include at least processing power; and merging data processing instructions from the one or more different virtual machines in the virtual environment with the locally-called data processing instruction in response to a determination that data processing instructions from the one or more different virtual machines and the locally-called data processing instruction are for same data in the virtual environment.

15. The method according to claim 14, wherein there is no sequence requirement for the deploying of the data processing system call interface, the data processing driver, and the data processing instruction optimizer.

16. The method according to claim 14, wherein the deploying the data processing system call interface in the virtual machine in the virtualization environment comprises:
registering a new system call number;
updating a system call sheet; and
adding a new function.

17. The method according to claim 14, wherein the data processing system call interface comprises one of: a data backup system call interface in response to the data processing instruction being a data backup instruction, and a data recovery system call interface in response to the data processing instruction being a data recovery instruction.

18. The method according to claim 17, wherein the data processing driver is a data backup driver and the data processing instruction optimizer is a data backup instruction optimizer in response to the data processing system call interface being a data backup system call interface.

19. The method according to claim 17, wherein the data processing driver is a data recovery driver and the data processing instruction optimizer is a data recovery instruction optimizer in response to the data processing system call interface being a data recovery system call interface.

20. The method according to claim 14, wherein the data processing instruction is called according to data processing metadata defined by the virtual machine.

* * * * *